(12) United States Patent
Eade et al.

(10) Patent No.: US 7,568,226 B2
(45) Date of Patent: Jul. 28, 2009

(54) DATA PROCESSING SYSTEM AND METHOD

(75) Inventors: Arndt Douglas Eade, Salisbury (GB); Hazel Heather Fix, Chandlers Ford (GB); Paul Kettley, Winchester (GB); Peter Siddall, Romsey (GB)

(73) Assignee: International Business Machines Corporation, Armonk, NY (US)

(*) Notice: Subject to any disclaimer, the term of this patent is extended or adjusted under 35 U.S.C. 154(b) by 1584 days.

(21) Appl. No.: 09/790,414

(22) Filed: Feb. 21, 2001

(65) Prior Publication Data

US 2002/0002677 A1    Jan. 3, 2002

Related U.S. Application Data

(60) Provisional application No. 60/183,925, filed on Feb. 22, 2000.

(51) Int. Cl.
*G06F 7/04* (2006.01)
*G06F 7/58* (2006.01)
*G06F 12/00* (2006.01)
*G06F 12/14* (2006.01)
*G06F 13/00* (2006.01)
*G06F 17/30* (2006.01)
*G06K 19/00* (2006.01)
*H04L 9/32* (2006.01)
*G11C 7/00* (2006.01)

(52) U.S. Cl. ...................................... 726/21

(58) Field of Classification Search .................. 713/166, 713/164, 182
See application file for complete search history.

(56) References Cited

U.S. PATENT DOCUMENTS 6,233,576 B1 * 5/2001 Lewis ............................ 707/9
6,412,070 B1 * 6/2002 Van Dyke et al. ........... 713/200

FOREIGN PATENT DOCUMENTS

JP          03125240 A   *  5/1991

\* cited by examiner

*Primary Examiner*—Emmanuel L Moise
*Assistant Examiner*—Nadia Khoshnoodi

(57) ABSTRACT

The present invention relates to a data processing system and method as well as to a computer program product for realizing such a data processing system and method. Conventionally, access to system resources is controlled within, for example, MQSeries, via security settings or security definition contained within profiles that are used to initialize a data processing system. Typically, each computer program or user has associated access permissions which may, from time to time, be varied by a system administrator. It will be appreciated that to issue on a resource by resource or user by user basis individual changes to access permission would require a significant amount of work. Suitably, the present invention provides a system and method for implementing grouping of security access control for a number of resources or users. Therefore, a single security change request can be used to effect a change of access permissions associated with a number of separate or at least closely coupled resources.

2 Claims, 5 Drawing Sheets

DATA PROCESSING SYSTEM AND METHOD

CROSS REFERENCE TO RELATED APPLICATION

This application claims priority and all other benefits under 35 U.S.C. §120 of prior filed co-pending U.S. provisional patent application Ser. No. 60/183925, filed Feb. 22, 2000 and is incorporated herein by reference thereto.

FIELD OF THE INVENTION

The present invention relates to a data processing system and method and, more particularly, to such a system and method for controlling access to system resources.

BACKGROUND

Within a data processing system the MQSeries™ for OS/390™ product fulfils the function of providing messaging and queuing services to an application via message queue interface (MQI) program calls. Within this system applications connect to a given queue manager via a suitable adapter. The adapter varies according to the type of application. Therefore, it will be appreciated that, for example, a CICS™ application would connect to a queue using a CICS adapter. It will be appreciated within the MQSeries environment that an application must connect to a specified queue manager and can only access specified queues associated with that application and that queue manager. Accordingly, to prevent unauthorised access to other queues and other queue managers, each queue manager has associated therewith a set of security profiles. The security profiles are used to control a set of security switches held within a queue manager. The initial setting of such security switches is established upon queue manager initialisation by an internal security resource manager component. For example, such a security manager component within the OS/390 operating system may require a series of interrogations to be made to an external security manager (ESM) product such as, for example, RACF which is used by an installation via a system authorisation facility (SAF) to determine which of the security switches of the queue manager should be set to an ON condition and which of the security switches should be set to an OFF condition. After the various security switch settings have been established via interrogation of suitable RACF profiles for a queue manager, the MQSeries security component resources are available for use by other components within the corresponding queue manager. At the highest level, security manager function is determined by a subsystem security switch. If the subsystem security switch is OFF then security checking will not take place within or for that queue manager. However, if the subsystem security switch is turned ON, then any of the remaining security switches can be validly set to either ON or OFF. The MQSeries security manager component can then be utilised by other MQSeries components to determine whether or not a given user ID has appropriate authority to perform various tasks in relation to names MQSeries resources such as, for example, queues or processes. The authorisation checks are performed using the RACF profiles in the form or qmgr.resourcename, where "qmgr" is a unique subsystem identifier associated with a queue manager. Each MQSeries queue manager has its own set of RACF profiles since the profiles are prefixed with a high level of qualifier which is a four character queue manager name. Therefore, it can be appreciated that a significant number of RACF profiles may exist since, within any given system of running an MQSeries product, there may be a large number of queue managers.

It can be appreciated that the control of access to MQSeries resources is performed at a queue manager level only. As previously mentioned, control at such a relatively low level requires a significant amount of data, in the form RACF security profiles, associated with each queue manager. Still further, if, for example, a system administrator or user wishes to change the security configuration of systems resources, such as queue managers or resources accessed by those queue managers, the is individual security settings for each system resource would have to be individually changed. In a queue sharing environment where many queue managers can access the same resources there is a still further proliferation of profiles.

It is an object of the present invention at least to mitigate the above problems of the prior art.

SUMMARY OF INVENTION

Accordingly, a first aspect of the present invention provides a method of controlling access with at least first and second computer programs to system resources of a data processing system, the first computer and second computer programs having respective first security control definitions that govern access to the system resources; the method comprising the steps of: providing a second set of security qualifiers comprising at least one second security qualifier (QSG.*) applicable jointly to at least both of the first and second computer programs; and providing a second security control definition corresponding to the at least one second security qualifier, the second security control definition being arranged, in use, to influence jointly the access by the first and second computer programs to the system resources.

Preferably, an embodiment provides a method in which the second security control definition is arranged to influence jointly the respective first security control definitions of at least both the first and second computer programs to control. Therefore, it can be appreciated that multiple resource managers, such as, for example, queue managers, can be controlled, that is, have their access or security parameters changed or established using a single, common, profile that is operable at the group sharing level.

It will be appreciated that the sphere of influence of the security checks varies according to the level at which security checking takes place. Suitably, embodiments provide a method in which the first and second security definitions represent a security hierarchy in which the second security definitions prevail over the first security definitions such that access to system resources is controlled by the second security definitions in the absence of any overriding action.

Preferably, an embodiment provides a method further comprising the step of invoking the second security control definition to control access of the both the first and second computer program to system resources.

In some embodiments setting security parameters at a one level such as, for example, at group sharing level or at a queue manager level, may affect adversely preferred individual security settings at a lower level such as, for example, at a queue manager level or subsystem level. Suitably, embodiments provide a method further comprising the step of changing the access to the system resources of at least one of the first and second computer programs by invoking a respective one of the first security control definitions subsequent to the step of invoking the second security control definitions.

Advantageously, whereas within the prior art each queue manager had an associated RACF security profile which governed not only access to local resources but also access to the shared resources, a single security profile is used to control access to the shared system resources within a resource sharing group or a queue sharing group. Suitably, system administration is reduced significantly.

Still further, since changes can be made to all resource managers within a shared resource group using a single security profile, changes to system security may be made using significantly fewer commands as compared to the prior art.

A second aspect of the present invention provides a system for controlling access of at least first and second computer programs to system resources of a data processing system, the first computer and second computer programs having respective first security control definitions that govern access to the system resources; the system comprising: means to provide a second set of security qualifiers comprising at least one second security qualifier (QSG.*) applicable jointly to at least both of the first and second computer programs; and means to provide a second security control definition corresponding to the at least one second security qualifier, the second security control definition being arranged, in use, to influence jointly the access by the first and second computer programs to the system resources.

A third aspect of the present invention provides a computer program product for controlling access of at least first and second computer programs to system resources of a data processing system, the first computer and second computer programs having respective first security control definitions that govern access to the system resources; the computer program product comprising a computer readable storage medium having embodied thereon: computer program code means to provide a second set of security qualifiers comprising at least one second security qualifier applicable jointly to at least both of the first and second computer programs; and computer program code means to provide a second security control definition corresponding to the at least one second security qualifier, the second security control definition being arranged, in use, to influence jointly the access by the first and second computer programs to the system resources.

Advantageously, since the security switches of a number of queue managers can be influenced, that is, changed or determined, from a single security profile, a system administrator can control more efficiently the access to and utilisation of the various resource, such as, for example, queue managers.

Within preferred embodiments, the first and second computer programs are queue managers.

BRIEF DESCRIPTION OF THE DRAWINGS

Embodiments of the present invention will now be described, by way of example only, with reference to accompanying drawings in which.

DETAILED DESCRIPTION

Figure 1:
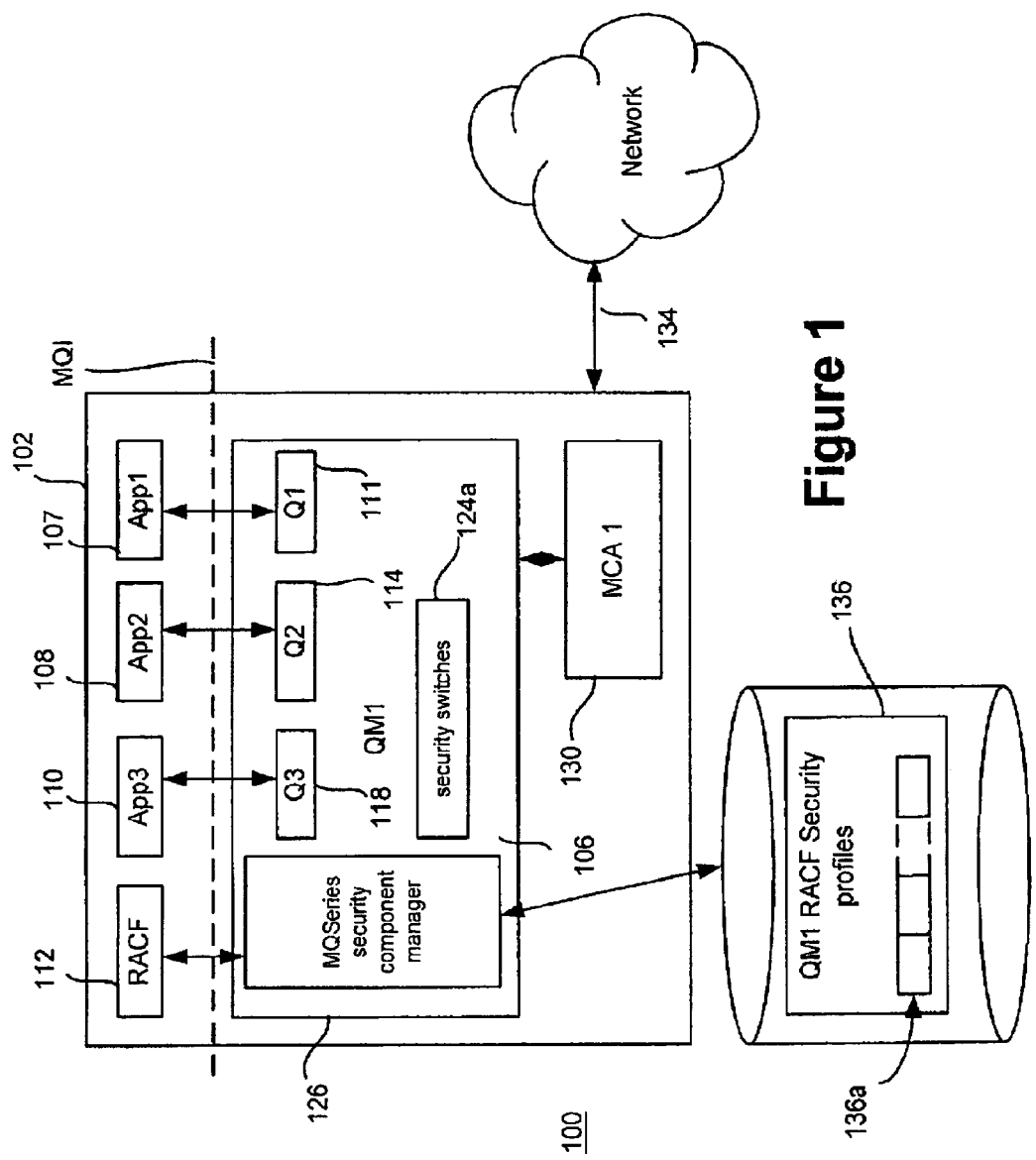
FIG. 1 illustrates a known message queuing data processing system.

The embodiments of the present invention will be described in the context of a data processing and communication network in which a plurality of communication managers and their connected application programs are arranged in a cluster or parallel sysplex and have shared access to certain data processing system resources.

Application programs running on different computers within the network are able to exchange data and hence interoperate using communication manager products such as MQSeries message queuing software products available from International Business Machines Corporation. Message queuing and commercially available message queuing products are described in "Messaging and Queuing Using the MQI", B. Blakeley, H. Harris and R. Lewis, McGraw-Hill, 1994, and in the following publications which are available from IBM Communication: "An introduction to Messaging an Queuing", (IBM document number GC33-0805-00) and "MQSeries-Message Queue and Interface Technical Reference" (IBM document number SC33-0850-01), all of which are incorporated herein by reference for all purposes.

IBM's MQSeries messaging software products provide transactional support, synchronising messages within local units of work in accordance with a messaging protocol which gives assured once and once-only message delivery even in the event of system or communication failures. MQSeries products provide assured delivery by not finally deleting a message from storage on a sender's system until it has been confirmed as being safely stored by a receiver's system, and by use of sophisticated recovery facilities. Prior to commitment of transfer of the message upon confirmation of successful storage, both the deletion of the message from storage at the sender system and the insertion into storage at the receiver system are kept "in doubt" and can be backed out automatically in the event of a failure or interruption to normal processing operations. Such a message transmission protocol and associated transactional and concepts of recovery facilities are described in International Patent Application Number WO95/10805 and U.S. Pat. No. 5,465,328, both of which are incorporated herein by reference for all purposes.

The message queuing inter-program communication support provided by the MQSeries for OS/390 products enables each application program to send messages to an input queue of any other target application program and each target application can asynchronously take these messages from its input queue for processing. The communication manager component which manages queues and provides services for the assured delivery of messages between application programs, including achieving a drop-ability between applications in a distributed heterogeneous network, is known as queue manager. The component which handles the transfer of a message from an outgoing transmission queue of a sent out queue manager across the network to an input queue of a receiver queue manager is known as a mover.

U.S. patent application Ser. No. 09/579677 discloses a message queuing system in which parameters are defined that enable a command to be targeted at specific resources of a computer system managed by an associated group of computer programs. The computer system resources are accessible to all members of a group and have an associated scope parameter defining shared or group access and held in shared storage. Command target qualifiers are defined which enabled a command to be targeted at either an individual computer program within the group or all or selected members of a group of computer programs. Hence, embodiments of the present invention enable a reduction in the time taken to perform administration and control operations in respect of computer system resources or shared computer system resources and also reduces the risk of inconsistent specification of commands that can arise when a system administrator is required to repeat entry of a command several times. U.S. patent application Ser. No. 09/579677 is incorporated herein by reference for all purposes.

It will be appreciated that without queue sharing groups, all security commands relevant to queue managers would involve the putting of a command within a message, establishing a communication channel to the queue manager and sending the message across the channel to a destination queue of that queue manager whereupon the message can be retrieved and effect given to the security command. It will be appreciated that the overhead inherent in this process can be reduced by using queue sharing groups in which security commands are effective at a queue sharing group level in addition to being jointly or severally effective at queue manager and subsystem ID security levels.

Referring to FIG. 1 there is shown message queuing systems 100 comprising a first 102 data processing system such as, for example, a System 390 running OS/390, available from International Business Machines Corporation. The first data processing system 102 comprises a number of applications 107 to 110 which exchange messages, via a message queuing interface (MQI), using a respective first queue manager 106. The queue manager 106 comprises a plurality of queues; namely, Q1 111, Q2 114 and Q3 118. The queue manager 106 further comprises a set of security switches 124a which controls the degree of access afforded to a queue manager to the system resources such as the queues 111 to 118 of the first data processing system 102.

Security is provided within the first data processing system 102 via a respective resource access control facility application (RACF) 112 together with a respective MQSeries security component resource manager 126.

The first data processing system 102 communicates with other data processing systems via a message channel agent 130 which, as is known to those skilled in the art, is guaranteed to deliver messages, that is, the MCA realises assured message delivery via a network 134. In the simplest case the network may comprise a simple network connection to another data processing system.

Each of the switches 124a within the queue manager 106 has an associated RACF security profile 136 (elements 136a represent the respective security profiles for the switches 124a) which determines or sets the status, that is, ON and OFF, of each of the security switches. The security switches are known as subsystem security switches. The subsystem security switches 124a, or rather the status of the subsystem security switches applicable to the queue manager 106, are established at start-up time by the internal security manager component 126 accessing the external security manager ESM product such as the RACF applications 112. The subsystem security switches can be changed during qmgr processing via the MQSeries Refresh Security Command, which will use the same mechanisms as at start up to refresh the security switch settings.

As indicated earlier the status of a switch, that is, whether it is deemed to be ON or OFF, is determined by the existence or otherwise of a corresponding RACF profile within one of a plurality of specific RACF classes used by or used in conjunction with MQSeries for OS/390.

The RACF classes supplied or used in conjunction with MQSeries classes are:

MQADMIN, which holds switch profiles together with RESLEVEL, context, alternative user and command resource profiles;

MQQUEUE, which holds profiles relating to access to queues within queue managers, MQNLIST, which relates to profiles for controlling access to namelists;

MQPROC, which holds profiles that control access to processes;

MQCONN, which holds profiles for controlling connection access to queue manager via different adapters and a mover (described hereafter); and.

MQCMDS, which holds profiles relating to access to MQSeries Commands.

The switch related profiles of MQADMIN have the following form and function:

qmgr.NO.SUBSYS.SECURITY, which corresponds to a subsystem (queue manager security) security switch;

qmgr.NO.CONNECT.CHECKS, corresponds to a connection security switch for controlling connections to a queue manager;

qmgr.NO.CMD.CHECKS, corresponding to a command checks security switch for controlling commands;

qmgr.NO.CMD.RESC.CHECKS, corresponds to a command resource security switch for controlling access to command resources;

qmgr.NO.CONTEXT.CHECKS, corresponds to context security switch for controlling access to the context information within a message;

qmgr.NO.ALTERNATE.USER.CHECKS, corresponds to an alternate user security switch relating to whether or not alternative users are allowed;

qmgr.NO.PROCESS.CHECKS, corresponds to a process security switch for controlling access to processes;

qmgr.NO.NLIST.CHECKS, corresponds to a namelist security switch relating to or for controlling access to namelists; and qmgr.NO.QUEUE.CHECKS, corresponds to a queue security switch relating to or for controlling access to queues.

The identifier "qmgr" is a unique subsystem identifier that is associated with a queue manager such as, for example, the first queue manager 106, at start-up. The subsystem identifier used within a profile cannot be generic since it must match the subsystem identifier exactly for or to allow the implementation of associated security controls.

As will be appreciated by those skilled in the art, if any of the above described security switch profiles are found by the internal security manager component 126, effect is given to those profiles to mark the corresponding security switches 124a as OFF (since the default is preferably that security is ON). It will be appreciated by those skilled in the art that a status of OFF implies or means that the corresponding security check or access control is not operational and will not be undertaken by the internal security component. Conversely, a status of ON indicates that the security check or access control is effective.

As will be appreciated by those skilled in the art if any of the qmgr.NO profiles are not found by the internal security component manager 126, effect is given to the corresponding security checks or access controls upon start-up, the default condition is that corresponding security switches 124a are set to ON.

Once the status of the security switches 124a have been determined and set, the security services of the internal security component resource manager 126 are ready for use by other components within the first data processing system 102.

It should be noted that if the subsystem level security switch, that is, SUBSYS.SECURITY is set to OFF, then no security checking or access controls will be enabled in relation to a corresponding queue manager 106. If the subsystem level security switch is set to ON, which is the default condition, then any of the remaining switches can be switched OFF or, in the absence of a profile, left in the default condition of ON. Other than at initialisation, the prior art does not comprise a profile for switching a security switch from an OFF condition to an ON condition. However, the prior art does allow one skilled in the art to change the setting of the switches on a qmgr by qmgr basis via the Refresh mechanism described above.

The MQSeries security manager component 126 can then be used by other components (not shown) within the first data processing system 102 to determine whether or not a given user, identified by a corresponding user ID, or resource, such as the queue manager 106, has authority to undertake various tasks against the MQSeries resources. It can be appreciated from the above that the resources are identified via a corresponding resource name, that is, the security checks or access controls are performed against RACF profiles having a form "qmgr.resourcename", where "qmgr" is a unique subsystem identifier for a queue manager and the stem "resourcename" is a resource for which access is to be controlled.

Figure 2:
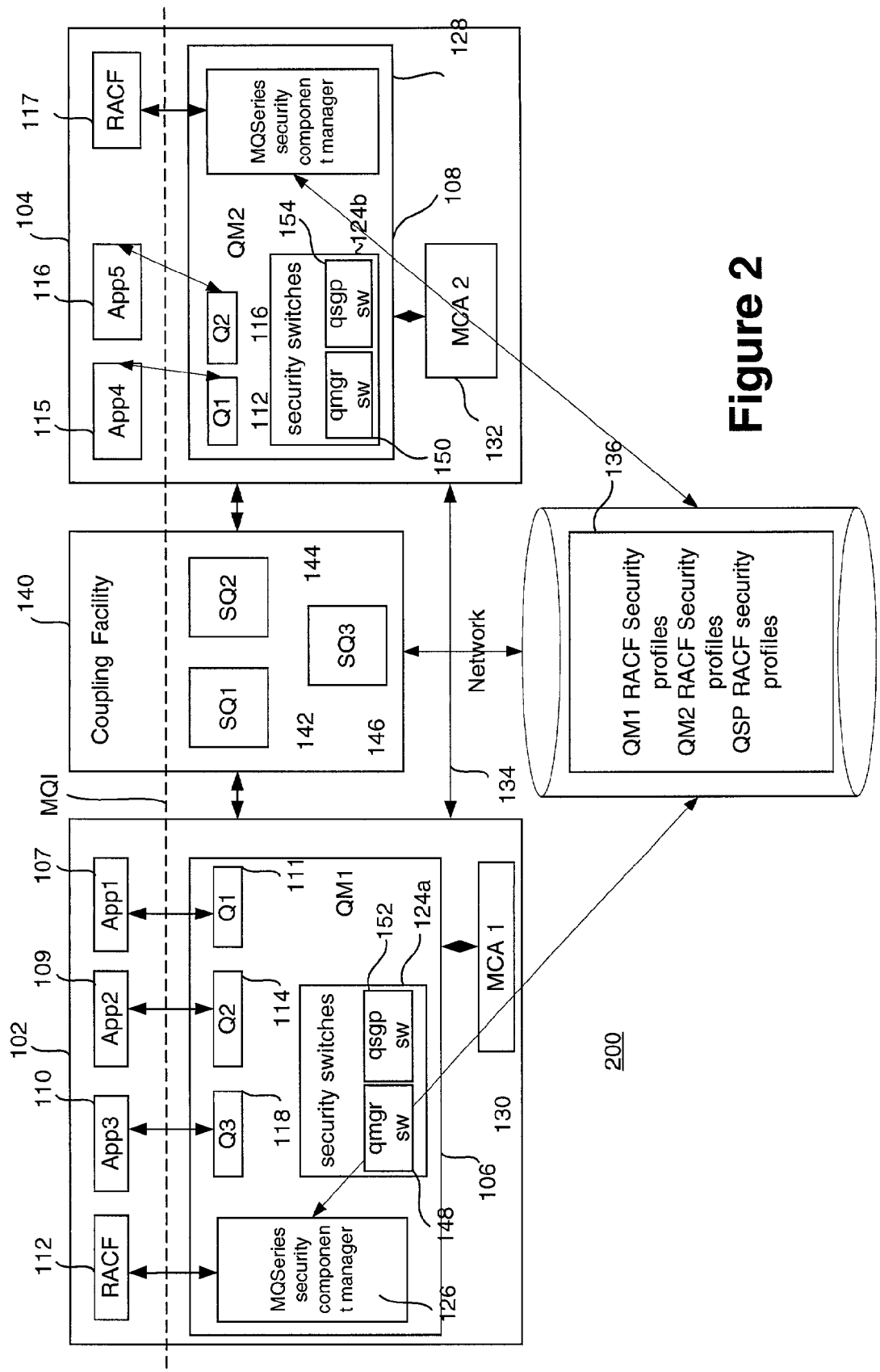
FIG. 2 illustrates data processing systems according to a first embodiment.

Referring to FIG. 2 there is shown first 102 and second 104 data processing systems comprising queue sharing group security or group access controls in accordance with a first embodiment of the present invention. It can be appreciated that there are many common aspects to the systems shown in FIGS. 1 and 2. Corresponding reference numerals relate to equivalent features which operate in substantially the same manner. Therefore, such features will not be described in detail in relation to FIG. 2. Similarly, the features of the second data processing system which correspond to similar features of the first data processing system operate in substantially the same manner and will not be described in detail. Still referring to FIG. 2, it can be seen that there is provided a coupling facility 140 which comprises a microprocessor (not shown) together with high bandwidth fibre optic links that are known as coupling facility channels to provide high speed connectivity between the coupling facility 140 and the first 102 and second 104 data processing systems. The coupling facility also supports additional resource such as, for example, a plurality of shared queues 142 to 146.

Within the first embodiment, queue sharing groups are supported. A queue sharing group is a group of queue managers such as the first 106 and second 108 queue managers shown in FIG. 2, which may be clones of one another or a group of individual queue managers, that can interact and co-operate with other queue managers within the group. Each queue manager 106 and 108, while still being responsible for controlling access to local resources, also has shared responsibility with other queue managers within a queue sharing group for controlling access to the shared resources such as, for example, shared queues 142 to 146.

It will be appreciated that a difference of the present invention over the prior art is the provision of queue manager switches 148 and 150 and group or queue sharing group switches 152 and 154 as additional security switches within the security switches 124*a* and 124*b* of each of the queue managers 106 and 108.

The security setting of the security switches 124*a* and 124*b* for the queue managers 106 and 108 are determined by the net effect of the queue sharing group profiles and the individual queue manager level profiles. The queue sharing group profiles used to set the security settings at a group level for all queue managers within a group. The queue manager profiles are used to set the security checks that are effective at a queue manager level and to override the effect of queue sharing group level profiles on a given qmgr at the qmgr level.

The queue sharing group (QSG) RACF profiles, within embodiments of the present invention, are defined as follows:

qsg.NO.SUBSYS.SECURITY, which corresponds to a subsystem security switch operative at the queue sharing group subsystem level;

qsg.NO.QMGR.CHECKS, which corresponds to a queue manager level switch for disabling security checking at a queue manager level;

qsg.NO.QSG.CHECKS which corresponds to a queue sharing group switch for disabling security checking at a queue sharing group level;

qsg.NO.CONNECT.CHECKS, which corresponds to a group level switch for controlling connections to a queue manager;

qsg.NO.CMD.CHECKS, which corresponds to a security switch for controlling command security at a group level;

qsg.NO.CMD.RESC.CHECKS, which corresponds to a group level security switch for controlling access to command resources;

qsg.NO.CONTEXT.CHECKS, which corresponds to a group level context switch for controlling access to the context information within a message;

qsg.NO.ALTERNATE.USER.CHECKS, which corresponds to a group level security switch for determining whether or not alternative users are supported;

qsg.NO.PROCESS.CHECKS, which corresponds to a group level switch for controlling access to processes;

qsg.NO.NLIST.CHECKS, which corresponds to a group level switch for controlling access to namelists; and qsg.NO.QUEUE.CHECKS, which corresponds to a group level security switch for controlling access to queues.

Where each of the qsg.resourcename implements or performs security or access control at a group level in relation to a named resource, regardless of whether that resource is a local resource or a shared resource such as, for example, a shared queue containing messages that are available to either of the queue managers 106 and 108 within a queue sharing group.

Preferably, as will be appreciated from the above, a queue sharing group profile comprises, as a high level qualifier 'qsg' which is the unique four character queue sharing group id for that queue sharing group.

Hence, it is possible by setting the queue sharing group level checking switches 152 and 154 to control access to common or shared resources such as, for example, shared queues, at a group level without having to undertake the setting of individual subsystem security level switches. Therefore, as will be appreciated from FIG. 2, setting the QSG level checking switches controls access on a group-wide basis via a single set of profiles rather than, as with the prior art, such access being controlled by all of the respective subsystem level security switches 124*a* and 124*b*.

It will be appreciated by those skilled in the art that the embodiments of the present invention become particularly useful when the number of queue managers increases. For example, if the first data processing system 102 had 10 queue managers, within the prior art, the RACF profiles or, that is, the subsystem level security switches, for all 10 queue managers would have to be changed in order to effect a global change in security or access control. In contrast, embodiments of the present invention, via the QUEUE SHARING GROUP level checking switches 152 and 154, can set security or access control conditions within all 10, or within a selected number of the 10 queue managers, using a single set of security switches that are effective at a group level.

It will be appreciated that the introduction of queue sharing group level RACF profiles brings the ability to control the security on all queue managers within a queue sharing group via a single set of security switch profiles. However, since, for a given group, a corresponding queue sharing group level profile controls the security for all queue managers within that group, embodiments preferably provide for security switch settings that are globally effective within an individual queue manager such that an individual queue manager can override the group level security settings. Suitably, further security profiles are preferably provided within embodiments of the present invention. The further security profiles are defined as:

qmgr.YES.SUBSYS.SECURITY, which corresponds to a subsystem security switch activating subsystem security on this queue manager and overriding a queue sharing group level profile qsg.NO.SUBSYS.SECURITY;

qmgr.NO.QMGR.CHECKS, which corresponds to a queue manager switch for disabling Queue Manager level security checking on this qmgr;

qmgr.YES.QMGR.CHECKS, which correspond to a queue manager switch for activating Qmgr level checking on this Queue manager and overridding a queue sharing group level profile qsg.NO.QMGR.CHECK;

qmgr.NO.QSG.CHECKS, which corresponds to a queue sharing group switch for disabling security checking at a queue sharing group level on this Queue Manager;

qmgr.YES.QSG.CHECKS, which corresponds to a queue sharing group switch for overriding a queue sharing group level profile qsg.NO.QSG.CHECKS and activating queue Sharing group level security checking on this Queue Manager qmgr.YES.CONNECT.CHECKS, which corresponds to a Connection security switch for overridding a queue sharing group level profile qsg.NO.CONNECT.CHECKS and activating connection security checking on this Queue manager;

qmgr.YES.CMD.CHECKS, which corresponds to a Command security switch for overriding a queue sharing group level profile qsg.NO.CMD.CHECKS and activating command security checking on this queue manager;

qmgr.YES.CMD.RESC.CHECKS, which corresponds to a Command Resource security switch for overriding a queue sharing group level profile qsg.NO.CMD.RESC.CHECKS and activating Command Resource security checking on this queue manager;

qmgr.YES.CONTEXT.CHECKS, which corresponds to a context security switch for overriding a queue sharing group level profile qsg.NO.CONTEXT.CHECKS and activating context security checking on this queue manager;

qmgr.YES.ALTERNATE.USER.CHECKS, which corresponds to an Alternate User security switch for overridding a queue sharing group profile qsg.NO.ALTERNATE.USER.CHECKS and activating Alternate user security checking on this queue manager;

qmgr.YES.PROCESS.CHECKS, which corresponds to a process security switch for overridding a queue sharing group profile qsg.NO.PROCESS.CHECKS and activating process security checking on this queue manager;

qmgr.YES.NLIST.CHECKS, which corresponds to a Namelist security switch, overriding a queue sharing group level profile qsg.NO.NLIST.CHECKS, activating namelist security checking on this queue manager; and qmgr.YES.QUEUE.CHECKS, which corresponds to a queue security switch for overriding a queue sharing group level profile qsg.NO.QUEUE.CHECKS, activating queue security checking on this queue manager.

It will be appreciated that for every switch at a queue manager level which can be switched OFF at a group level, there can exist a corresponding qmgr.YES.nnnnnn which can override the group level security settings.

Figure 3:
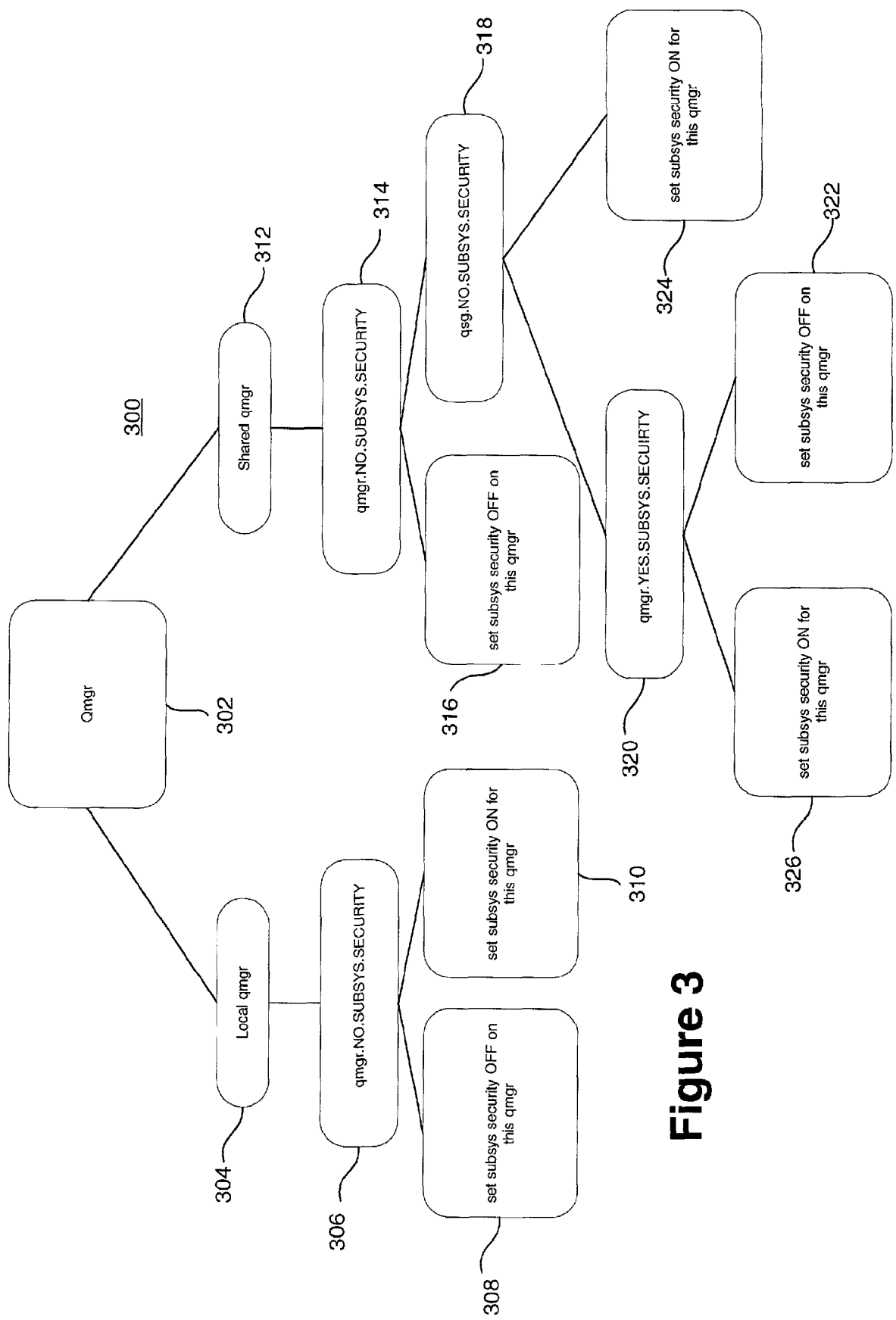
FIG. 3 depicts a flowchart for invoking security settings within data processing systems as shown in the first embodiment at a subsystem level according to an embodiment.

Referring to FIG. 3 there is shown a flowchart 300 for establishing the subsystem security settings applicable to system resources at start-up. At step 302, it is determined whether or not a queue manager in question forms part of a group. If a queue sharing group is not found, then security controls at a group level are not effective for the current queue manager and control passes to steps 304 and 306 where it is determined whether or not an RACF profile exists to control security at a subsystem level, that is, the existence of a qmgr.NO.SUBSYS.SECURITY is determined. If a qmgr.NO.SUBSYS.SECURITY profile is found, the security checking at the subsystem level for the current queue manager is switched OFF at step 308. Conversely, if a qmgr.NO.SUBSYS.SECURITY profile is not found, the subsystem security level checking for the current queue manager remains effective, that is, switched ON as indicated by step 310.

If the determination at step 302 was such that the current queue manager forms part of a queue sharing group, control passes to steps 312 and 314 where it is determined whether a qmgr.NO.SUBSYS.SECURITY RACF profile exists for the current queue manager. If a qmgr.NO.SUBSYS.SECURITY profile does exist, security checking at the subsystem level for the current queue manager is switched OFF at step 316. If it is determined at steps 312 and 314 that a qmgr.NO.SUBSYS.SECURITY profile does not exist, a determination is made at step 318 whether a qsg.NO.SUBSYS.SECURITY profile exists to switch OFF the subsystem level security checking at the group level. If a qsg.NO.SUBSYS.SECURITY profile does exist, subsystem security checking is switched OFF for all queue managers within a corresponding group and control passes to step 320 where a determination is made whether or not a qmgr.YES.SUBSYS.SECURITY profile exists for overriding security settings imposed at a queue manager level as a consequence of that queue manager being part of a group. If the qmgr.YES.SUBSYS.SECURITY profile does exist, the security settings for the current queue manager are switched on, that is, the subsystem level security switches are set to ON, step 326, at the queue manager level allowing individual switch settings at the queue manager level to be switched on, step 324. However, if the qmgr.YES.SUBSYS.SECURITY profile does not exist, the SUBSYSTEM SECURITY level checking remains OFF, step 322, in accordance with the qsg.NO.SUBSYS.SECURITY profile found at step 318.

Once the subsystem level security settings for a queue manager have been determined and have been established, the remaining security setting for the security switches associated with a queue manager are established.

Figure 4:
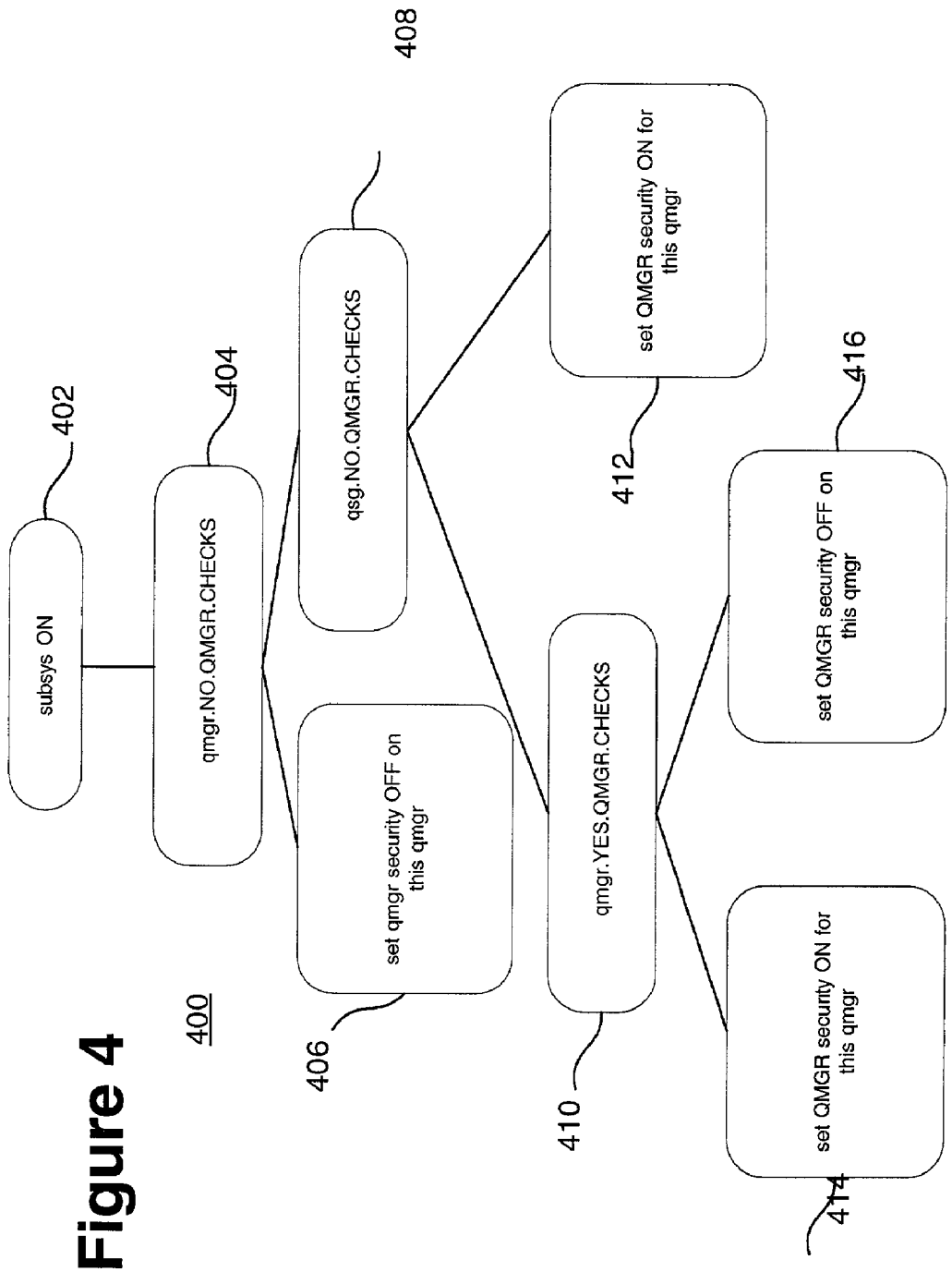
FIG. 4 illustrates a second flowchart for giving effect to security settings at a resource level according to an embodiment.

Referring to FIG. 4 there is shown a flowchart 400 for security level processing that is performed once it has been determined that the SUBSYS level security checking illustrated in FIG. 3 is effective. The flowchart of FIG. 4 determines whether or not security checking at the queue manager level should be made effective notwithstanding any settings at the group SUBSYS level to the contrary as can be appreciated from step 402. It can be appreciated that a search is made for a qmgr.NO.QMGR.CHECKS profile at step 404. If such a profile is found, the queue manager level security checks are disabled at step 406. If such a profile is not found, control passes to step 408 where it is determined whether or not a qsg.NO.QMGR.CHECKS profile exists for a current queue manager for which security is being established. If such a qsg.NO.QMGR.CHECKS profile does exist, effect is given to that profile at the queue manager level and then control passes to step 410 where it is determined whether or not a qmgr.YES.QMGR.CHECKS profile exist which will override the effect of the qsg.NO.QMGR.CHECKS profile for the group. If the determination at step 410 is such that a qmgr.YES.QMGR.CHECKS profile does exist, effect is given to that profile at step 414 where the queue manager security checking is enabled for the queue manager identified by the 'qmgr' high level qualifier. However, if it is determined at step 410 that a qmgr.YES.QMGR.CHECKS profile does not exist, the QMGR security level switch is set OFF, step 416, for the queue manager corresponding to the unique identifier 'qmgr' as determined by the qsg.NO.QMGR.CHECKS profile found at step 408. If at step 408 it is determined that a qsg.NO.QMGR.CHECKS profile does not exist, control passes to step 412 where the queue manager security settings for the current queue manager are set to ON.

Figure 5:
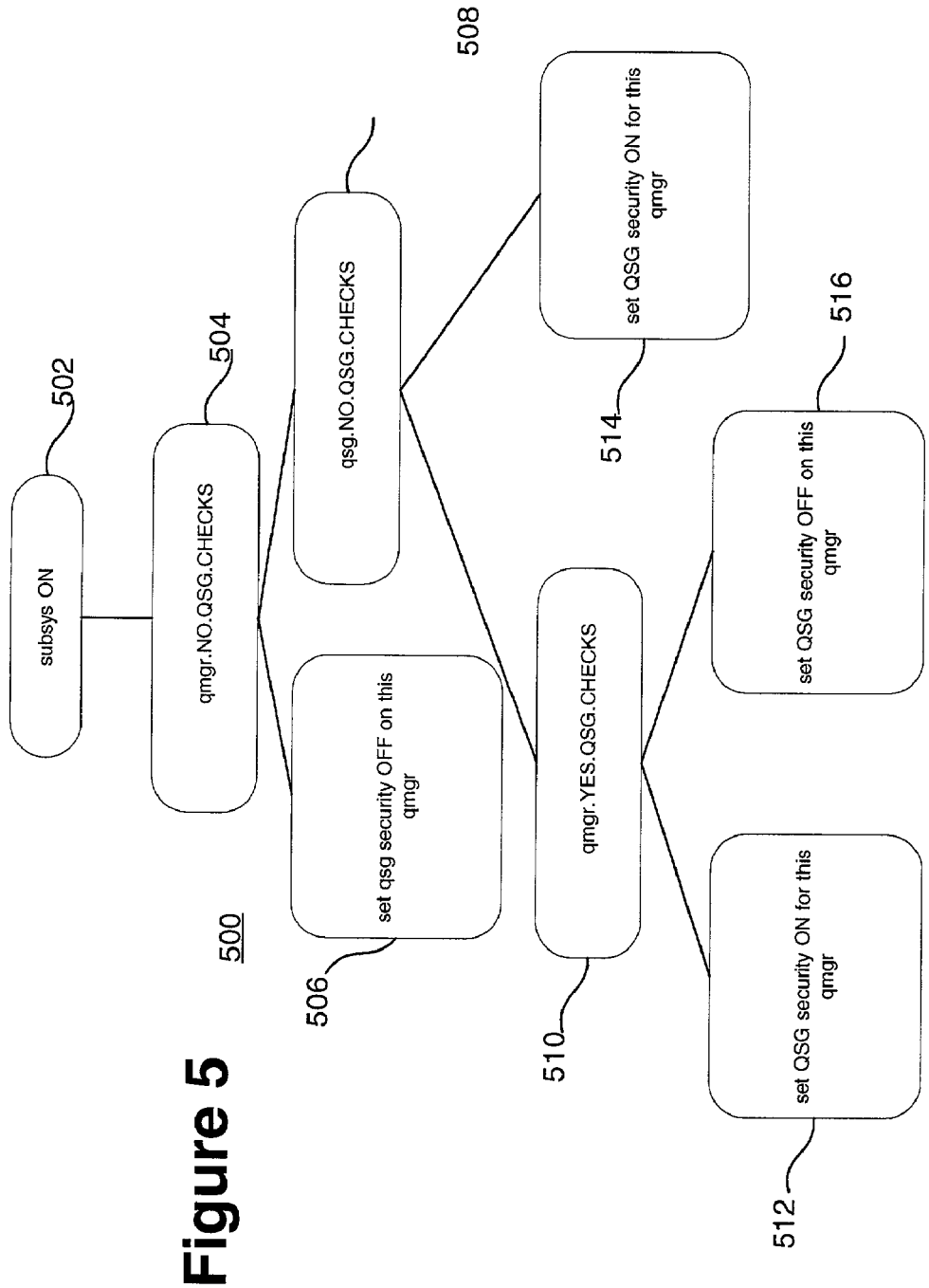
FIG. 5 shows a flowchart for invoking security settings at a resource group level.

Referring to FIG. 5 there is shown a flowchart 500 for establishing the security switch settings at a queue sharing group level. It can be appreciated from step 502 that the subsystem security checks are enabled. At step 504, it is determined whether a qmgr.NO.QSG.CHECKS profile exists. If such a profile does exist, the group level security checks are disabled for the queue manager identified by the 'qmgr' at step 506. If such a profile does not exist, a determination is made, at step 508, whether or not a group level profile qsg.NO.QSG.CHECKS exists, which, as will be appreciated from the above, controls whether or not security checking is performed at the group level. If such a profile does exist, control passes to step 510 where it is determined if a qmgr.YES.QSG.CHECKS profile exist, which overrides the qsg.NO.QSG.CHECKS, for the queue manager identified by the 'qmgr' qualifier. If it is determined that a qmgr.YES.QSG.CHECKS profile does exist, the group level security checking for the identified queue manager is enabled at step 512. However, if is it determined that a qmgr.YES.QSG.CHECKS profile does not exist, the group level security checks remain OFF at step 516 in accordance with the profile identified at step 508. If the determination at step 508 is that a qsg.NO.QSG.CHECKS profile does not exist, the group level security checks remain effective as can be seen from step 514.

It will be appreciated that the further security checks illustrated by FIGS. 4 and 5 relate to the queue sharing group and queue manager level security checks.

It will be appreciated that once the subsystem security switch, queue manager level checking security switch and the queue sharing group level checking security switch have been established for the current queue manager, then the remaining security switch settings for the current queue manager can be determined by searching for profiles which are dictated by the setting of the qmgr and qsg checks switches. For example if the QMGR.CHECKS switch has been set to OFF then only the qsg.NO.CONNECT.CHECKS profile would be searched for to determine the setting of the connection security switch.

The processing shown in FIGS. 3 to 5 may be undertaken, for example, each time a system administrator changes security checking of the resources of a data processing system. Table 1 below illustrates the possible security settings of an embodiment of the present invention.

TABLE 1

| SECURITY LEVEL | SECURITY SETTING | EFFECT |
| --- | --- | --- |
| Subsystem security | OFF | All security checking is disabled. |
| Subsystem security | ON | Subsystem level security is ON, Queue manager security is effective and only qmgr qualified profiles will be looked for to set remaining security settings. |
| Queue manager level security | ON | |
| Group level security | OFF | |
| Subsystem level security | ON | Group level security profiles are effective and only qsg qualified profiles will be looked for to set remaining switches. |
| Queue manager level security | OFF | |
| Group level security | ON | |
| Subsystem level security | ON | The security processes illustrated in FIGS. 3 to 5 are executed for each of the remaining switches to establish security settings |
| Queue manager level | ON | |
| Group level security | ON | |

Preferably, an embodiment is provided in which the security setting at the queue manager level, that is, QMGR level, and the group level, that is, QSG level, cannot both be set OFF as this effectively disables security checking and is equivalent to switching OFF security checking using a NO.SUBSYS.CHECKS profile. Preferably, if an attempt is made to switch OFF both the QMGR and QSG level security checks, the security settings defaults to both qmgr and qsg switches being set to ON.

It will be appreciated from the above the that the present invention adds, effectively, two new security switches (controlled by three new profiles each) which govern the profiles subsequently searched for, and two new security profiles for each of the existing security switches.

A summary of the SWITCHES, both existing and new, together with their associated profiles, both existing and new are described below.

Switch; SUBSYSTEM security switch (existing) Profiles; qmgr.NO.SUBSYS.SECURITY (existing), qsg.NO.SUBSYS.SECURITY (new), qmgr.YES.SUBSYS.SECURITY (new).

Switch; QMGR level security checking switch (new) Profiles; qmgr.NO.QMGR.CHECKS (new), qsg.NO.QMGR.CHECKS (new), qmgr.YES.QMGR.CHECKS (new).

Switch; QSG level security checking switch (new) Profiles; qmgr.NO.QSG.CHECKS (new, qsg.NO.QSG.CHECKS (new), qmgr.YES.QSG.CHECKS (new).

Switch; Connection security switch (existing) Profiles; qmgr.NO.CONNECT.CHECKS (existing), qsg.NO.CONNECT.CHECKS (new), qmgr.YES.CONNECT.CHECKS (new).

Switch; Command security switch (existing) Profiles; qmgr.NO.CMD.CHECKS (existing), qsg.NO.CMD.CHECKS (new), qmgr.YES.CMD.CHECKS (new).

Switch; Command Resource security switch (existing) Profiles; qmgr.NO.CMD.RESC.CHECKS (existing), qsg.NO.CMD.RESC.CHECKS (new), qmgr.YES.CMD.RESC.CHECKS (new).

Switch; Context security switch (existing) Profiles; qmgr.NO.CONTEXT.CHECKS (existing), qsg.NO.CONTEXT.CHECKS (new), qmgr.YES.CONTEXT.CHECKS (new).

Switch; Alternate User security switch (existing) Profiles; qmgr.NO.ALTERNATE.USER.CHECKS (existing), qsg.NO.ALTERNATE.USER.CHECKS (new), qmgr.YES.ALTERNATE.USER.CHECKS (new).

Switch; Process security switch (existing) Profiles; qmgr.NO.PROCESS.CHECKS (existing), qsg.NO.PROCESS.CHECKS(new), qmgr.YES.PROCESS.CHECKS (new).

Switch; Namelist security switch (existing) Profiles; qmgr.NO.NLIST.CHECKS (existing), qsg.NO.NLIST.CHECKS (new), qmgr.YES.NLIST.CHECKS (new).

Switch; Queue security switch (existing) Profiles; qmgr.NO.QUEUE.CHECKS (existing), qsg.NO.QUEUE.CHECKS (new), qmgr.YES.QUEUE.CHECKS (new).

Once all the switch settings have been established and it is determined that security checking is required on the current queue manager all resource security checking for the current queue manager will be as follows:

If the Qmgr level checking security switch is ON and the qsg level security checking switch is OFF then only profiles of the form 'qmgr.resourcename' will be searched for;

If the Qsg level checking security switch is ON and the qmgr level security checking switch is OFF then only profiles of the form 'qsg.resourcename' will be searched for;

If the Qmgr level checking security switch is ON and the qsg level security checking switch is ON then profiles of the form 'qmgr.resourcename' will be searched for first and if a matching one is not found then a profile of the form 'qsg.resourcename' will be searched for.

Although the above embodiments have been described with reference to a first and second data processing system, it will be appreciated that the first and second data processing system can be considered, at a more abstract or general level, as a single data processing system which merely comprises or which is constructed from multiple hardware platforms. Hence, the scope of the term data processing system comprises both single platform systems and multiple, possibly heterogeneous, platforms systems.

Although the illustrative embodiment shown in FIG. 2 depicts two data processing system operating in conjunction with a coupling facility having shared resources, the present invention is not limited thereto. Embodiments can be realised in which queue managers hosted by a single data processing system are arranged in groups. Therefore, the present invention is suitable for controlling security of a group of system resources, such as queue managers, within a single data processing system.

We claim:

1. A method of controlling access with at least first and second computer programs to system resources of a data processing system, the first and second computer programs having respective first security control definitions that govern access to the system resources, the method comprising the steps of:

providing a second set of security qualifiers comprising at least one second security qualifier applicable jointly to at least both of the first and second computer programs; and providing a second security control definition corresponding to the at least one second qualifier, the second security control definition being arranged, in use, to influence jointly the access by the first and second computer programs to the system resources;

in which first and second security control definitions represent a security hierarchy in which the second security control definition prevails over the first security control definition such that access to system resources is controlled by the second security control definition in the absence of invoking the first security control definition.

2. A data processing system for controlling access with at least first and second computer programs to system resources of a data processing system, the first and second computer programs having respective first security control definitions that govern access to the system resources, the system comprising:

queue manager means for providing a second set of security qualifiers comprising at least one second security qualifier applicable jointly to at least both of the first and second computer programs; and queue manager means for providing a second security control definition corresponding to the at least one second qualifier, the second security control definition being arranged, in use, to influence jointly the access by the first and second computer programs to the system resources in which first and second security control definitions represent a security hierarchy in which the second security definition prevails over the first security control definition such that access to system resources is controlled by the second security control definition in the absence of invoking the first security control definitions.

* * * * *